A. H. RAHM.
TOOL HOLDER FOR LATHES, PLANERS, AND OTHER WORKING MACHINES.
APPLICATION FILED JUNE 26, 1908.
946,947.
Patented Jan. 18, 1910.
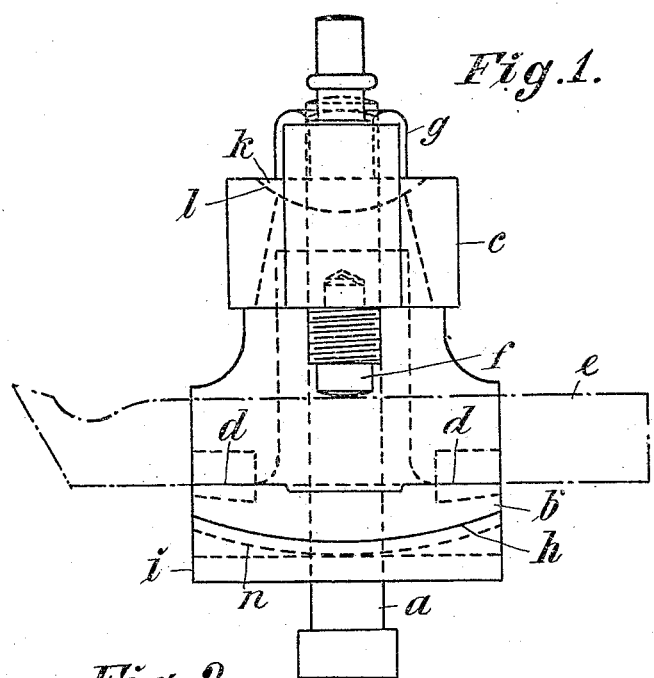
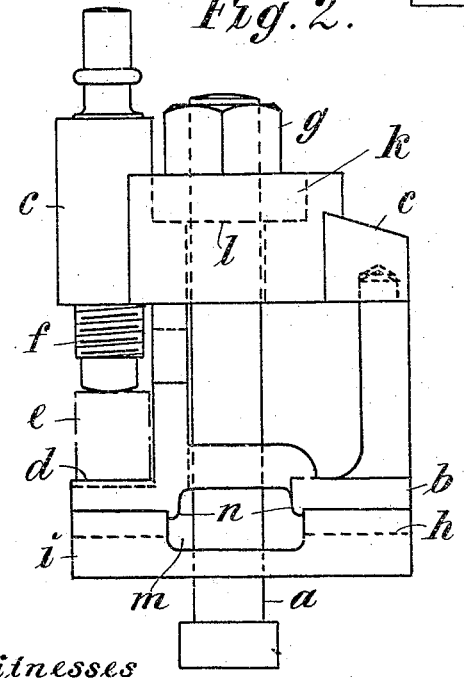
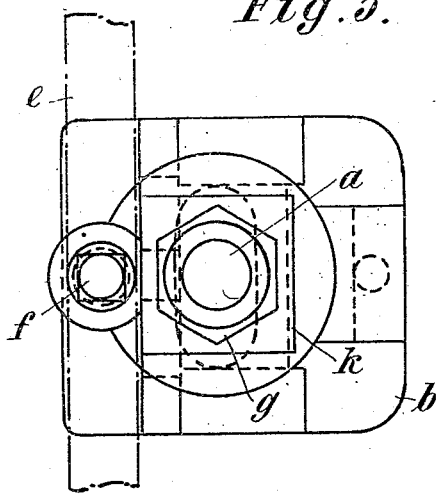
Witnesses
Inventor
Arvid Harald Rahm.

UNITED STATES PATENT OFFICE.

ARVID HARALD RAHM, OF REFTELED, SWEDEN, ASSIGNOR TO JOHAN AUGUST PETERSON, OF REFTELED, SWEDEN.

TOOL-HOLDER FOR LATHES, PLANERS, AND OTHER WORKING-MACHINES.

946,947. Specification of Letters Patent. Patented Jan. 18, 1910.

Application filed June 26, 1908. Serial No. 440,509.

*To all whom it may concern:*

Be it known that I, ARVID HARALD RAHM, a subject of the King of Sweden, and resident of Refteled, in the Kingdom of Sweden, have invented new and useful Improvements in Tool-Holders for Lathes, Planers, and other Working-Machines, of which the following is a specification, reference being had to the drawing accompanying and forming a part hereof.

This invention relates to tool holders for lathes, planers and other working machines.

The object of the invention is to make it possible to readily and firmly adjust the tool of a lathe, planer, or other working machine within certain limits in any desired plane or any desired angle to the work, without any wedges or packings of any kind being used, and to make it possible to secure the tool by a single grip by which the tool is not only secured in the holder but at the same time the latter is firmly secured to the slide rest or the table or the like on which the holder is mounted.

The invention consists, chiefly, in the combination of a lower support, an upper support, means for pressing the said supports toward each other, and clamping parts for the tool mounted between the said supports in such a manner as to be able to swing bodily like a pendulum about a common center.

The invention may be carried out as follows: The tool holder is secured to the working table or the slide rest movable thereon by an upright post or screw bolt which may be attached to the table or slide rest in any suitable way. The tool holder is suitably mounted about the said bolt or post in such a manner as to be able to swing about a vertical axis so that the tool may be adjusted to operate the work from different sides. The parts of the holder formed by the clamping plates or blocks form together a pendulum (ordinary or rotary) whose center of oscillation is located on the longitudinal axis of the vertical connecting bolt. By this means it is not only possible to adjust the tool in a more or less inclined position but it is also possible to adjust the angle of the cutting edge of the tool in relation to the direction of the cut in the work. The tool holder is divided, in the longitudinal direction of the upright post or connecting bolt, into two parts, one forming a support for the tool and the other provided with a set screw for clamping the tool in position. When the said screw is tightened against the tool, the two parts of the tool holder are at the same time moved slightly apart by which the said parts are firmly clamped between the upper and lower supports.

The invention further consists in the construction and combination of parts hereinafter set forth.

In the drawing, Figures 1 and 2 are side views, at right angles to each other, of a tool holder embodying the invention. Fig. 3 is a plan-view of the said tool holder.

Referring to the drawing, $a$ is a central post or bolt connecting the parts of the tool holder which is shown in a form adapted for use in engine-lathes. The lower end of the said post or bolt may be supported in the usual slide rest (not illustrated).

Placed on the post $a$ are the clamping-plates or blocks $b$ and $c$ of which the lower one $b$ serves as a support for the tool which is placed on the upper bearing surfaces $d, d$ of the said plate $b$. The tool $e$ is clamped against the said bearing surfaces $d, d$ by a screw $f$ screwed into the part $c$. The parts $b$ and $c$, of which the upper one is suitably guided in the lower one, are movable in the longitudinal direction of the post $a$. When the screw $f$ is tightened against the tool $e$, the parts $b$ and $c$ are pressed slightly apart, whereby the said parts are firmly clamped between the underlying base-plate at one side and the nut $g$ screwed on the upper, screw-threaded end of the post or bolt $a$ at the other side. At the same time the tool $e$ is firmly clamped in position.

The parts $b$ and $c$ of the tool holder may be said to form a pendulum adapted to swing about a fulcrum on the longitudinal axis of the bolt $a$. It is obvious that the parts $b$ and $c$ of the tool holder may be mounted so as to be capable of swinging in any direction in the same manner as a rotary pendulum. In the embodiment illustrated said parts are, however, capable of swinging only in one vertical plane in the same manner as an ordinary pendulum. The underside $h$ of the part $b$ is supposed to be formed to the shape of the segment of a cylinder and bears on a correspondingly recessed shoe or base-plate $i$ so that the part $b$ rests conformably and movably upon the said plate. The nut $g$ bears with its lower side on a part $k$ the lower side $l$ of which is concentric to the lower side $h$ of the part $b$ and bears on the correspondingly recessed upper side of the part $c$. The tool holder proper $b, c$ may thus be swung in one direction or the other between and along the concentric cylindrical surfaces $h$ and $l$, whereby the tool $e$ will, obviously, be caused to take up a more or less inclined position. In order to enable such a swinging movement to be performed, the clamps must, obviously be eased by loosening the screw $f$ by which not only the tool but all the parts of the tool holder will be movable. By a slight turning of the screw $f$ the tool $e$ and all the parts of the tool holder are firmly secured in relation to each other and to the slide rest or working table.

A special advantage of the construction described is that the tool may be readily and firmly adjusted in any desired position, without the angle between the tool and the set screw $f$ being changed. The tool will, therefore, always be reliably secured in position, and the drawback of the set screw sliding against the tool, which is frequently met with, when the adjustment of the tool is performed by wedges or other similar parts, is entirely removed.

If it is desired that the tool holder $b$ $c$ shall be adapted to swing in any direction like a rotary pendulum, the surfaces $h$ and $l$ must obviously be formed to the shape of the segment of a sphere instead of to the segment of a cylinder. In such case the lower clamp $b$ must, obviously, be provided with a wide opening for the post $a$ in order to allow the swinging movement of the clamps.

In order to prevent shavings and the like from entering between the bearing surfaces of the parts $b$ and $i$ a recess or channel $m$ open at both ends may be provided in the shoe or base-plate $i$, the bottom of said channel lying at a lower level than the said bearing surfaces. Shavings and the like may thus accumulate on the bottom of the said channel from whence they may be easily removed from time to time. In order to prevent the shavings in the channel $m$ from entering between the aforesaid bearing surfaces, small downwardly projecting flanges $n$ may be provided at the clamp $b$.

A further advantage of the construction hereinbefore described is that the tool is entirely free at one side, so that it may easily be removed and re-inserted sidewise, instead of being moved through an opening, as is usually the case in other tool holders. This facilitates the use of tools of any shape and size of the cutting end, and the part of the tool situated in the holder may be of any desired width.

Having now described my invention, what I claim as new and desire to secure by Letters Patent is:—

1. In a tool-holder, the combination of a lower support, an upper support, means for pressing the said supports toward each other, clamping parts for the tool mounted between the said supports in such a manner as to be able to swing bodily about a common center, the upper one of the said clamping parts being supported at one side by the lower clamping part, and a set screw mounted in the upper clamping part, remote from the fulcrum of the upper clamping part on the lower one, said screw bearing with its lower end on the tool, substantially as and for the purpose set forth.

2. In a tool-holder, the combination of a lower support, an upper support, means for pressing the said supports toward each other, clamping parts mounted between the said supports in such a manner as to be able to swing bodily about a common center, the lower one of said clamping parts having a supporting surface for the tool allowing the latter to be placed in position and removed laterally, without changing the position of the clamping parts, and a set screw carried by the upper clamping part and adapted to be screwed on to the tool, substantially as and for the purpose set forth.

3. In a tool holder, the combination of a lower support having an upper concavely-curved bearing surface, an upper support having a lower convexly-curved bearing surface concentric with the bearing surface of the lower support, means for pressing the said supports toward each other, clamping parts loosely mounted between the bearing surfaces of the said supports and resting conformably and movably against the said bearing surfaces, said bearing surfaces having such a form as to allow the said clamping parts to swing bodily about a common center, and protecting flanges projecting downwardly from the lower clamping part into a longitudinal groove in said lower support, substantially as and for the purpose set forth.

In testimony whereof I have signed my name to this specification in the presence of two subscribing witnesses.

ARVID HARALD RAHM.

Witnesses:
JUSTUS ELGSKOG,
J. P. FREDMAN.